(12) United States Patent
Okeda

(10) Patent No.: US 7,856,278 B2
(45) Date of Patent: Dec. 21, 2010

(54) PROGRAMMABLE CONTROLLER DEVICE

(75) Inventor: Hideo Okeda, Mishima (JP)

(73) Assignee: OMRON Corporation, Kyoto (JP)

( * ) Notice: Subject to any disclaimer, the term of this patent is extended or adjusted under 35 U.S.C. 154(b) by 388 days.

(21) Appl. No.: 11/368,094

(22) Filed: Mar. 2, 2006

(65) Prior Publication Data

US 2006/0236013 A1 Oct. 19, 2006

(30) Foreign Application Priority Data

Mar. 15, 2005 (JP) ............................. 2005-072342

(51) Int. Cl.
G05B 11/01 (2006.01)
(52) U.S. Cl. ................................ 700/19; 700/9; 700/22
(58) Field of Classification Search ................ 700/100, 700/291–299, 9, 19, 22; 710/2, 5, 18–21, 710/300; 714/14, 22

See application file for complete search history.

(56) References Cited

U.S. PATENT DOCUMENTS

| | | | |
|---|---|---|---|
| 4,124,889 A | | 11/1978 | Kaufman et al. |
| 5,327,435 A | * | 7/1994 | Warchol ...................... 714/36 |
| 5,659,705 A | * | 8/1997 | McNutt et al. ............... 711/115 |
| 5,754,798 A | * | 5/1998 | Uehara et al. ................ 710/104 |
| 5,809,311 A | * | 9/1998 | Jones ......................... 713/300 |
| 5,896,534 A | * | 4/1999 | Pearce et al. .................. 710/17 |
| 5,998,886 A | * | 12/1999 | Hoshino et al. ............... 307/66 |
| 6,421,215 B1 | * | 7/2002 | Bushue ....................... 361/93.1 |
| 6,539,486 B1 | * | 3/2003 | Rolls et al. ................... 713/323 |
| 6,880,967 B2 | * | 4/2005 | Isozumi et al. ............... 374/102 |
| 2003/0195719 A1 | | 10/2003 | Emori et al. |
| 2005/0034003 A1 | * | 2/2005 | Sato et al. .................... 713/340 |
| 2006/0192523 A1 | | 8/2006 | Nomoto |

FOREIGN PATENT DOCUMENTS

| | | |
|---|---|---|
| EP | 0182044 | 6/1992 |
| JP | 06-332508 | 12/1994 |
| JP | 07-234707 | 9/1995 |
| JP | 07-281719 | 10/1995 |
| JP | 09-204209 | 8/1997 |
| JP | 11-085219 | 3/1999 |
| JP | 11-212604 | 8/1999 |
| JP | 2000-203134 | 7/2000 |
| JP | 2000-222025 | 8/2000 |

(Continued)

OTHER PUBLICATIONS

Korean patent publication No. 1998-87752, published Dec. 5, 1998.

*Primary Examiner*—Paul L Rodriguez
*Assistant Examiner*—Carlos Ortiz Rodriguez
(74) *Attorney, Agent, or Firm*—Weaver Austin Villeneuve & Sampson LLP

(57) ABSTRACT

A programmable controller device has a main body with a CPU unit and I/O units connected by a bus line and a power unit for supplying power to the main body. The CPU unit has a memory with a user access area which is accessible by instruction of user program. The power unit generates status data related to itself such as its temperature. A data transmission path is provided between the CPU unit and the power unit for transmitting such status data to the user access area.

11 Claims, 13 Drawing Sheets

FOREIGN PATENT DOCUMENTS

| | | |
|---|---|---|
| JP | 2003-022127 | 1/2003 |
| JP | 2003-243269 | 8/2003 |
| JP | 2003-295914 | 10/2003 |
| JP | 2004-364373 | 12/2004 |
| KR | 2000-8581 | 7/2000 |
| TW | 154222 | 3/1991 |
| TW | 424196 | 3/2001 |
| WO | 2005/003941 | 1/2005 |

\* cited by examiner

PROGRAMMABLE CONTROLLER DEVICE

Priority is claimed on Japanese Patent Application 2004-072342 filed Mar. 15, 2005.

BACKGROUND OF THE INVENTION

This invention relates to a programmable controller (PLC) device comprised of a main body which is formed by connecting a CPU unit with one or more I/O units through a bus line and a source unit for supplying power to the main body.

FIG. 14 is a block diagram showing the structure of a conventional PLC as a whole, including a main body unit 50*a*, a first expansion unit 50*b*-1, power units 1A, a CPU unit 2, I/O units 3, special function (SF) units 4, a bus connector 6 provided to the main body unit for external connection, bus connectors 7 and 8 provided to the first expansion unit for external connection and parallel bus lines PB. Briefly described, this PLC system is formed by connecting a single main body unit 50*a* and one or more expansion units 50*b*-1-50*b*-*n* through connector bus lines PB'.

The main body unit 50*a* includes a PLC main body formed by connecting a CPU unit 2, one or more I/O units 3 and a special function unit 4 through a parallel bus line PB and a power unit 1A for supplying power to this PLC main body. The first expansion unit 50*b*-1 includes an inner unit array formed by connecting one or more I/O units 3 and a special function unit 4 through a parallel bus line PB and a power unit 1A for supplying power to this unit array.

Such a PLC system is also referred to as being of a so-called building block type, and the structure with a parallel bus line PB provided on a back plane and the structure having partitioned parallel bus lines PB which are directly connected and each provided to one of the individual units have been known. In other words, PLC devices of the type comprised of a PLC main body formed with a CPU unit 2, one or more I/O units 3 and a special function unit 4 connected through a parallel bus line PB and a power unit 1A for supplying power to the PLC main body has conventionally been known.

Since the power unit 1A contained in the main unit 50*a* or the first expansion unit 50*b*-1 is for supplying power to the PLC main body in the main unit 50*a* or the unit array in the first expansion unit 50*b*-1, if it fails, the main unit 50*a* and the first expansion unit 50*b*-1 become incapacitated and there may be a serious consequence on the controlled target object. Since power units of this type contain a component with a finite useful lifetime such as an electrolytic capacitor, failures due to secular degradation are inevitable.

In view of above, Japanese Patent Publication Tokkai 2003-243269 disclosed an electric power source device for supplying power to an electronic apparatus adapted to measure the temperature of the electrolytic capacitor contained within the power source device, to estimate the lifetime of the device based on the result of a measurement and to display the result of the estimate on a 7-segment display device attached to the outer surface of the power source device or to provide an external output contact point for switching when the lifetime becomes less than a specified value.

As shown in FIG. 14, however, conventional PLC devices do not have a data transmitting path for exchanging data between the PLC main body inclusive of the I/O units 3 and the special function unit 4 and the power unit 1A. Thus, even if the function for estimating the lifetime is incorporated in the power unit 1A, the lifetime data obtainable therefrom cannot be utilized by the PLC main body unless a special external wiring is provided.

Thus, if the lifetime data obtainable from the power unit 1A could be taken to a specified area within a memory of the CPU unit 2 (accessible by a command word forming the user program or the system program), various meaningful applications would become possible by using such data in the user program or the system program.

SUMMARY OF THE INVENTION

It is therefore an object of this invention to provide a PLC device capable of directly using data generated within the power unit such as lifetime data on the side of the PLC main body without providing external wiring or the like.

Other objects and effects of this invention will become clear to persons skilled in the art by referencing the disclosure herein.

A programmable controller device according to this invention has a programmable controller main body having a CPU unit and one or more I/O units connected by a bus line and a power unit for supplying power to the programmable controller main body. The CPU unit has a memory with a user access area which is accessible by instruction (command language) of user program, and the power unit has status data generating means for generating status data related to the power unit. In the above, "accessible" means that data can be written in and/or read out and "user program" means a program that is created and altered by the user of the PLC such that the control desired by the user can be carried out by executing this program.

Between the CPU unit and the power unit, furthermore, there is provided a data transmission path for transmitting status data generated by the status generating means to the user access area. With a structure as described above, status data generated by the status data generating means provided to the power unit can be transmitted to the user access area of the memory provided to the CPU unit. Thus, there is no need to connect the power unit and the CPU unit with a particular wiring or to adopt a different structure whereby the output from the power unit is taken up by the PCT main body through the I/O unit.

The data transmission path to be provided between the power unit and the CPU unit can take different forms. If the CPU unit and the I/O unit (or units) forming the PLC main body are connected through a parallel bus line, a dedicated serial bus line may be used as the data transmission path. If the CPU unit and the I/O unit (or units) forming the PLC main body are connected through a serial bus line, this serial bus line may be extended to form the data transmission path. If the CPU unit and the I/O unit (or units) forming the PLC main body are connected through a parallel bus line, the data transmission path may be formed by connecting a dedicated serial bus line to the parallel bus line through a serial-parallel converter. If the CPU unit and the I/O unit (or units) forming the PLC main body are connected through a serial bus line, the data transmission path may be formed by connecting a dedicated serial bus line to the serial bus line through a gate circuit. According to a preferred embodiment of the invention, the bus line connects to one or more expansion units through connecting bus lines, and the user access area has dedicated areas assigned individually to these expansion units. In this way, not only data from the power unit of the main body but those from the power units of the expansion units can be utilized by the PLC main body.

It is further preferable that dedicated commands for carrying out a specified calculation by using as calculation parameters status data transmitted to the aforementioned user access area are usable as instruction that forms the user program, or that the user program includes an instruction for execution of a specified calculation by using status data transmitted to the user access area as calculation parameter. In such a case, such dedicated commands can be used in the user program to carry out various useful functions without the necessity for the user to incorporate any complicated program. In other words, the system can preliminarily prepare functions considered to be optimum, based on data from the power unit, and the user has only to insert corresponding dedicated commands into the user program in order to carry out these intended useful functions.

The status data generating means may include detecting means for measuring a specified physical quantity related to the power unit and output the measured physical quantity as the status data such that the measured physical quantity can be directly taken into the user access area of the inner memory of the CPU unit. Thus, the internal status of the power unit can be directly grasped and can be made used in various calculation and judgment processes.

The status data generating means may preferably include detecting means for measuring a specified physical quantity related to the power unit and function so as to obtain a specified status quantity based on the measured physical quantity by the detecting means and a known correlation and to output the status quantity obtained thereby as the status data such that the PLC main body can directly grasp the status of the power unit without incorporating any calculating unit itself.

The status data generating means may more preferably include detecting means for measuring a specified physical quantity related to the power unit, functioning so as to obtain a specified status quantity based on the measured physical quantity by the detecting means and a known correlation, to carry out status judgment by comparing the physical quantity measured by the detecting means or the status quantity obtained thereby with a specified standard quantity and to output results of the status judgment as the status data such that the PLC can more directly grasp the status of the power unit.

In the above, physical quantities of various kinds can be considered such as the current and/or voltage on the current-receiving side of the power unit such that it can be readily determined whether an abnormality experienced on the PLC main body side is due to the commercial power source supplying power to the power unit or it is due to a trouble with the power unit itself. If the specified physical quantity is the voltage and/or the current on the current-transmitting side of the power unit, it can be readily determined whether an abnormality experienced on the PLC main body side is due to a trouble with the power unit itself or it is somewhere between the power unit and the PLC main body.

The specified physical quantity may be selected as the temperature inside the power unit. In the case of a structure having the PLC main body and the power unit contained in a closed control board provided with a fan for air discharge, such temperature data can be used to control the fan so as to prevent the lifetime of the power unit from being adversely affected by an overheated condition.

In such a case, if the dedicated command for outputting a certain command when the inner temperature of the power unit has exceeded a reference level can be used as the instruction used in the user program, such a dedicated command can be incorporated in the user program and the control of the air discharge fan can be easily realized.

The specified physical quantity may be the cumulative power-on time of the power unit such that it may be compared with a reference value through a user command such as a comparison command such that a proper counter-measure can be taken, for example, by making a display on the programmable display device or an output of an alarm buzzer.

The specified physical quantity may be the temperature of an electrolytic capacitor in the power unit and the status quantity may be the remaining time for the replacement of the power unit. By this example, the remaining time for the replacement of the power unit can be properly grasped on the side of the PLC main body and if it is compared with a reference value, a proper counter-measure can be taken, for example, by making a display on the programmable display device or an output of an alarm buzzer.

In such a case, the dedicated command for outputting a certain command when the remaining time for the replacement serving as the status data becomes lower than a normal reference level may be an instruction used in the user program such that this dedicated command may be used in the user program and that the replacement time can be dependably grasped before the power unit reaches its useful lifetime.

The aspects of the present invention described about related to a programmable controller device also apply to a PLC system having one main body and one or more expansion units. Thus, a programmable controller system according to this invention may be characterized as comprising a main body, one or more expansion units and a bus line that connects this main body with these expansion units, and further wherein the main body comprises a programmable controller main body having a CPU unit and one or more I/O units connected by a bus line and a power unit for supplying power to this programmable controller main body. In the above, the CPU unit has a memory with a user access area for individual units which is accessible by a user command, and the power unit has status data generating means for generating status data related to the power unit. Each of these expansion units comprises one or more expansion I/O units connected through a bus line, an expansion power unit for supplying power to these expansion I/O units, the expansion power unit including additional status data generating means for generating status data related to the expansion power unit. The programmable controller system further comprises a data transmission path between the CPU unit and the power unit and between the CPU unit and the expansion power units for transmitting status data generated by the status generating means and the additional status generating means to the user access area is provided between the CPU unit and the power unit.

With a system thus structured, not only status data from the power unit of the main body but also status data from the power units of the expansion units can be utilized by the PLC main body and hence the status of the entire system related to the power units can be controlled as a whole. The status data generated by the status generating means provided to the power units can be transmitted directly to the user access area of the memory in the CPU unit without the need to connect the power units with the PLC main body separately such that these status data can be freely utilized in the user program or the system program.

DETAILED DESCRIPTION OF THE INVENTION

A PLC system according one embodiment of this invention will be described next with reference to FIGS. 1-13.

Figure 1:
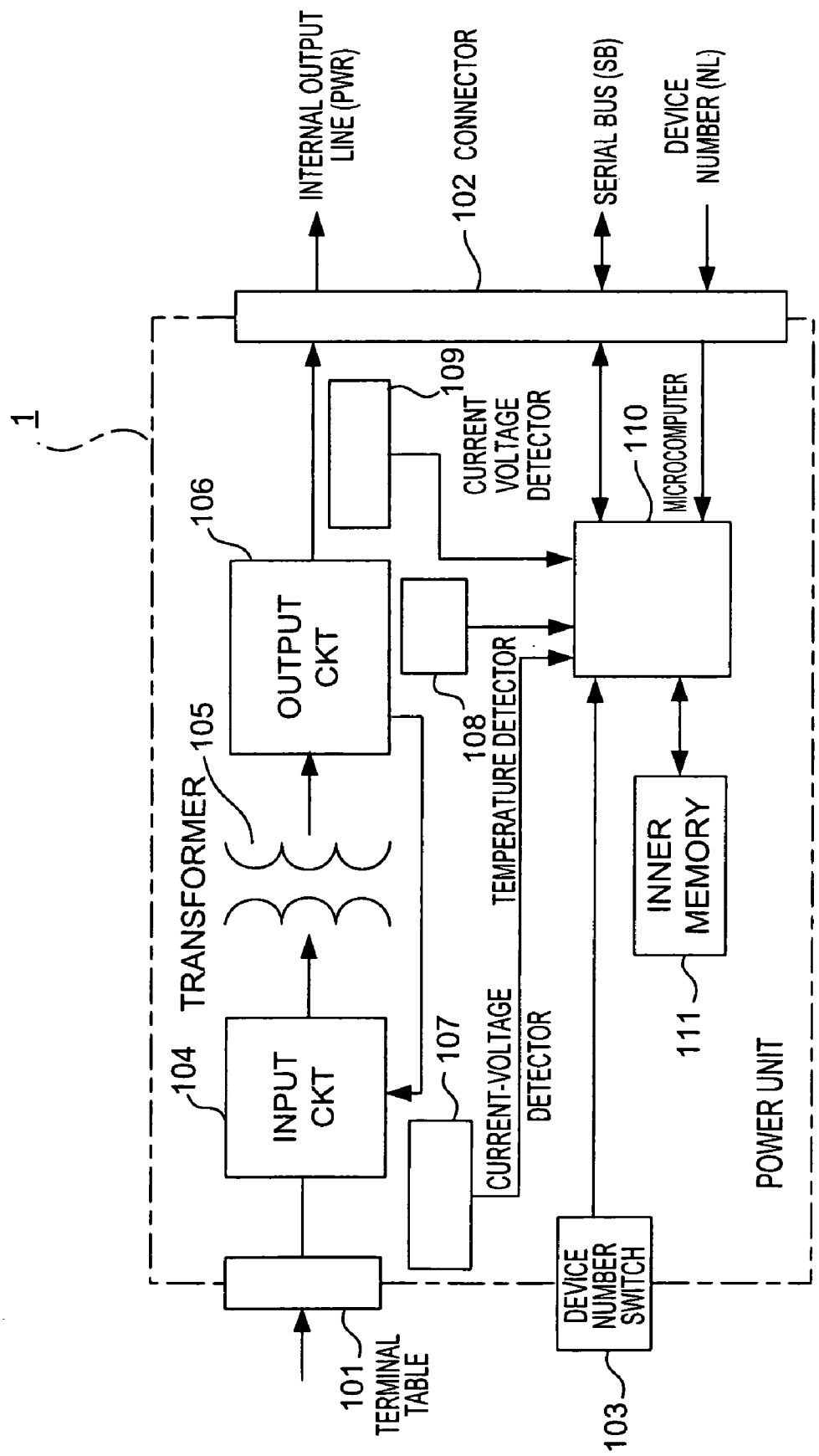
FIG. 1 is a block diagram showing the electric hardware structure of a power unit embodying this invention.

FIG. 1 is a block diagram showing the electric hardware structure of a power unit 1 embodying this invention. As shown, this power unit 1 includes a terminal table 101 functioning as a power input terminal for receiving power from a commercial AC power source (such as AC100V and AC200V) from outside and a connector 102 functioning as a transmission terminal for transmitting internally generated stabilized DC source to an internal output power line (PWR) to the PLC main body. Numeral 103 indicates a device number setting switch which is for setting the device number (N) of this power unit 1 and may comprise a dip switch.

Numeral 104 indicates an input circuit having the function of rectifying the AC obtained from the terminal table 101, converting it into DC, and thereafter switching to convert this DC to AC with specified frequency. In other words, this is a circuit having both the AC-to-DC and DC-to-AC conversion functions.

Numeral 105 indicates a transformer for transforming the AC voltage obtained from the input circuit 104 and to supply the transformed voltage to an output circuit 106. The output circuit 106 obtains a stabilized DC source by rectifying and stabilizing the AC obtained from the transformer 105 and outputs it to the internal output power line PER which is the power supply path from the connector 102 serving as a power transmitting terminal to the PLC main body. Thus, the power source circuit within the power unit 1 includes the input circuit 104, the transformer 105 and the output circuit 106.

The interior of this power unit 1 contains various detectors ("detecting means") for generating status data related to itself such as a first voltage-current detector 107 for detecting the voltage and/or the current on the current-receiving side of this power unit 1, a temperature detector 108 for detecting a temperature inside the power unit 1 (or in particular in this example the temperature of an electrolytic capacitor incorporated in the power source circuit) and a second voltage-current detector 109 for detecting the voltage and/or the current on the current transmitting side of this power unit 1.

Values of physical quantities detected by these detectors 107, 108 and 109 are read into a microcomputer 110 (serving as status data generating means), which generates status data of the power unit 1 based on these detected values of the physical quantities.

The process carried out by the microcomputer 110 for generating status data may comprise any of what are hereinafter referred to as the first status data generating process, the second status data generating process and the third status data generating process.

In the above, the first status data generating process is a process of generating and outputting a physical quantity measured by measuring means (such as the detectors 107, 108 and 109) for measuring a specified physical quantity about this power unit itself as the status data. The second status data generating process includes calculating so as to obtain a specified status quantity based on a physical quantity measured by measuring means for measuring a specified physical quantity about this power unit and a known correlation and outputting a status quantity thus obtained as the status data. The third status data generating process includes calculating so as to obtain a specified status quantity based on a physical quantity measured by measuring means for measuring a specified physical quantity about this power unit and a known correlation, carrying out status judgment by comparing the obtained status quantity with a specified reference quantity and outputting the results of the status judgment as status data.

The aforementioned "specified reference quantity" which is necessary for the status judgment is preliminarily stored in a non-volatile inner memory 111. The recording into this inner memory 111 is effected, as will be described in detail below, as an alarm output setting value transmitted from the CPU unit is received by the microcomputer 110 to be written in.

As explained above, a device number (N) may be set to the power unit 1. The setting of a device number may be effected by storing setting data obtained from the device number setting switch (SW) 103 or received from the serial bus (SB) for CPU communication in the inner non-volatile inner memory 111 through the microcomputer 110.

This power unit 1 is connectable through the connector 102 not only to the internal output power line (PWR) for supplying power and to the serial bus (SB) for data communication but also to a signal line (NL) for receiving a device number.

Figure 2:
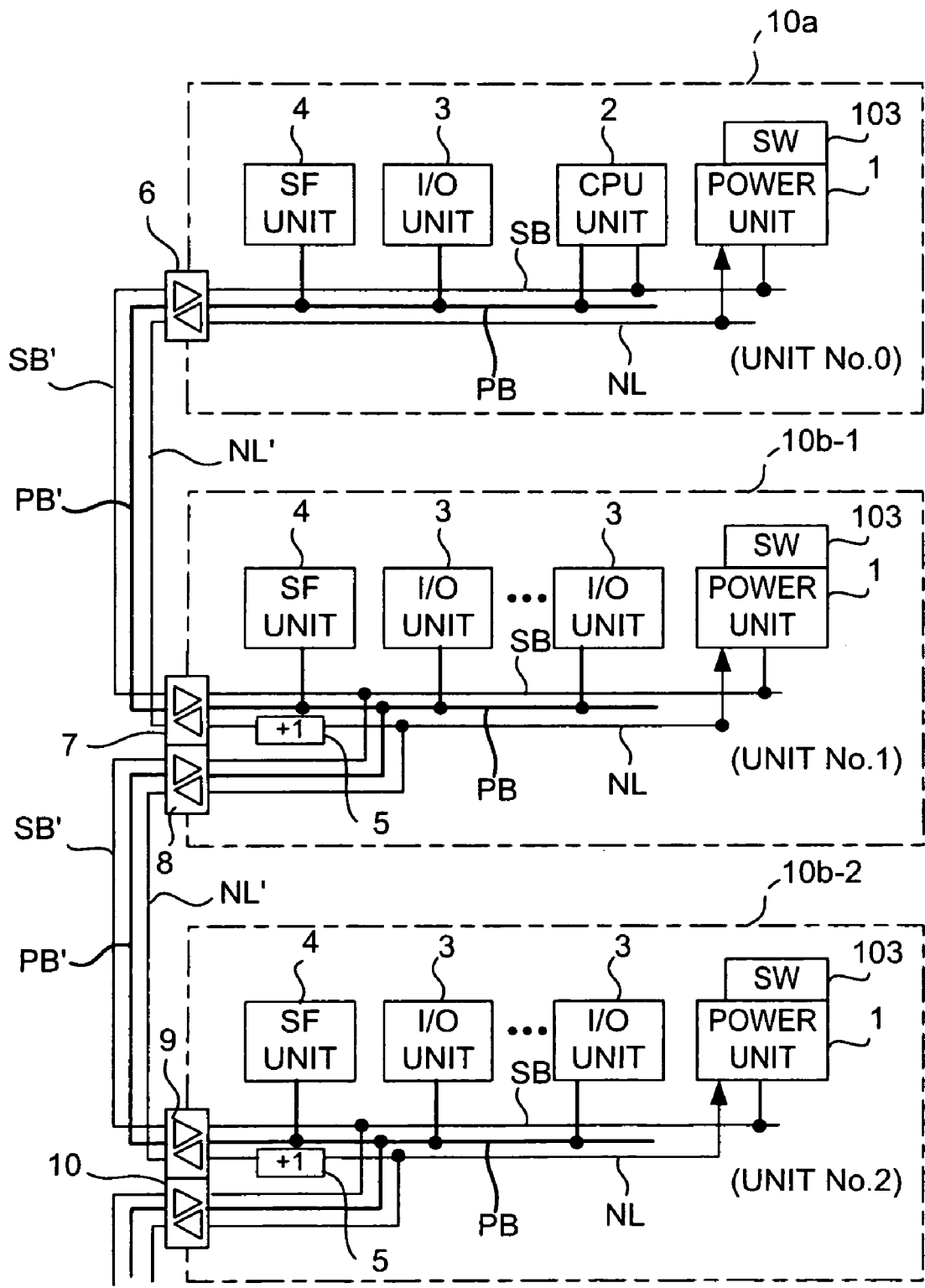
FIG. 2 is a block diagram showing the structure of a PLC system as a whole.

FIG. 2 is a block diagram showing the structure of a PLC system as a whole. This is being shown as an example of a system comprising a single main body device 10a and one or more expansion units 100b-1, 100b-2, . . . . The main body device 10a includes a PLC main body which is composed of one CPU unit 2, one or more I/O units 3 and a special function (SF) unit 4 and a power unit 1 for supplying power to the PLC main body. Numeral 103 again indicates a device number setting switch (SW) which may comprise a dip switch. If the PLC system is of a type having its main body device and expansion units connected together on a back plane provided with bus lines, the device number setting switches 103 may each be formed with a jumper pin or the like disposed at a specified position on the back plane.

The CPU unit 2, the I/O units 3 and the special function unit 4 which form the PLC main body are connected together in common through a parallel bus line PB. In this example, the device number of the power unit 1 of the main body device 10a is set to be "0".

Each of the expansion units 10b-1, 10b-2, includes a main body part composed of one or more I/O units 3 and a special function unit 4 and a power unit 1 for supplying power to the main body part. For convenience, numeral 103 again indicates a device number setting switch. The I/O units 3 and the special function unit 4 which form the main body part are connected together in common through a parallel bus line PB. In this example, the device number of the power unit 1 of the first expansion unit 10b-1 is set to be "1" and that of the second expansion unit 10b-2 is set to be "2".

The main body device 10a and the expansion units 10b-1 and 10b-2 are each provided according to this invention with a serial bus line SB and a device number line NL. The three lines PB, SB and NL in each of the main body device 10a and the expansion units 10b-1 and 10b-2 are connected in order through connecting lines PB', SB' and NL'. Thus, the CPU unit 2 of the main body device, the power unit 1 of the main body device and the power units 1 of the individual expansion units are connected in common to the system of the serial bus lines SB. The power unit 1 in the main body device and the power units 1 of the individual expansion units are connected together in common on the device number line NL. Numerals 5 in the figure each indicate an adder for adding 1 to the address of each unit that is sequentially connected such that sequentially increasing numbers can be assigned to these sequentially connected units.

With connections thus made, data transmission paths are provided between the CPU unit 2 and the power unit 1 of the main body device 10a and between the CPU unit 2 of the main body device 10a and the power units 1 of the individual expansion units 10b-1 and 10b-2 for sequentially transmitting to user access areas of a memory in the CPU unit 2 of the main body device 10a all status data generated by status data generating means (formed by a microcomputer) provided to each power unit 1 as well as status data generated by status data generating means provided to the power units of the expansion units. Numerals 6, 7, 8, 9 and 10 of FIG. 2 each indicate a two-direction bus connector for external connections.

The inner structure of the CPU unit 2 will be explained next on simple terms. Although not shown, the CPU unit 2 includes a microprocessor, an ASIC and a memory and operates these constituent components appropriately to carry out the function of a PLC by cyclically executing a common process, an input-output refresh process, a command execution process and a system service process. Since details of execution of these processes are commonly known by persons skilled in the art, detailed explanations of these processes will be herein dispensed with.

Figure 3:
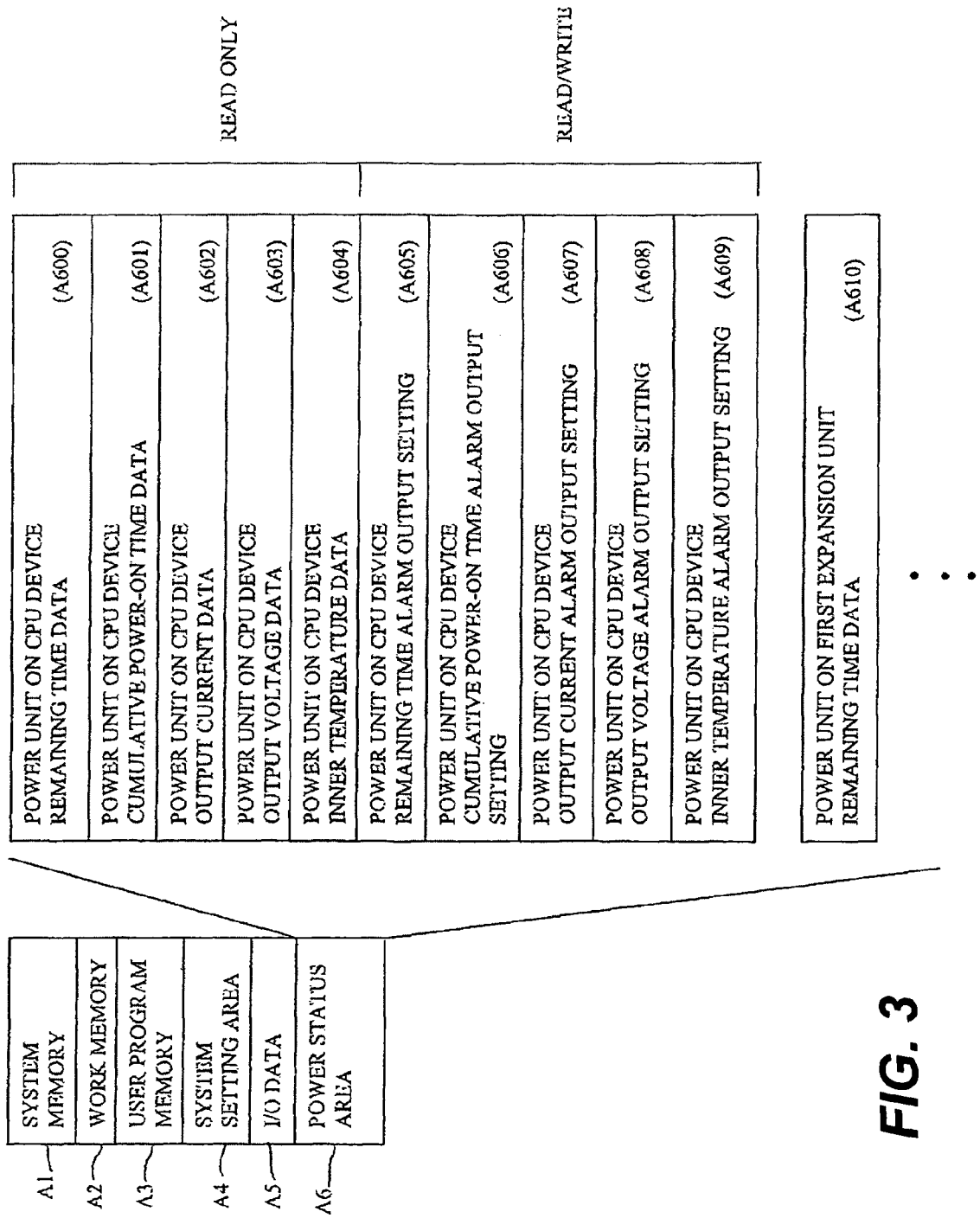
FIG. 3 is a memory map of the CPU unit.

FIG. 3 shows a memory map of the CPU unit. As shown, the inner memory of the CPU unit includes a system memory area A1, a work memory area A2, a user program memory area A3, a system setting area A4, an I/O data area A5 and a power status area A6. Of these areas, the I/O data area A5 and the power status area A6 are regarded as user access areas that are accessible by the instruction forming the user program.

The power status area A6 is divided into a main body device area and each of expansion device areas. As shown expanded in FIG. 3, the main body device area includes a remaining time data area A600, a cumulative power-on time data area A601, an output current data area A602, an output voltage data area A603, an inner temperature data area A604, a remaining time alarm output setting area A605, a power-on time alarm output setting area A606, an output current alarm output setting area A607, an output voltage alarm output setting area A608 and an inner temperature alarm output setting area A609. Areas A00-A604 are read-only areas from which data can only be read out by the instruction of the user program, storing therein data that were obtained by communications with the power units, as will be explained below. Areas A605-A609 are read-write areas into which data can also be written by the instruction of the user program, storing therein set values to be set for the power units through communications. Although not shown in the figure, read-only and read-write areas are provided also to each of the expansion unit areas in which similar data are stored. Alarm output setting data stored in the read-write areas of the memory map of FIG. 3 are stored in the aforementioned inner memory 111 of the power unit 1.

Figure 4:
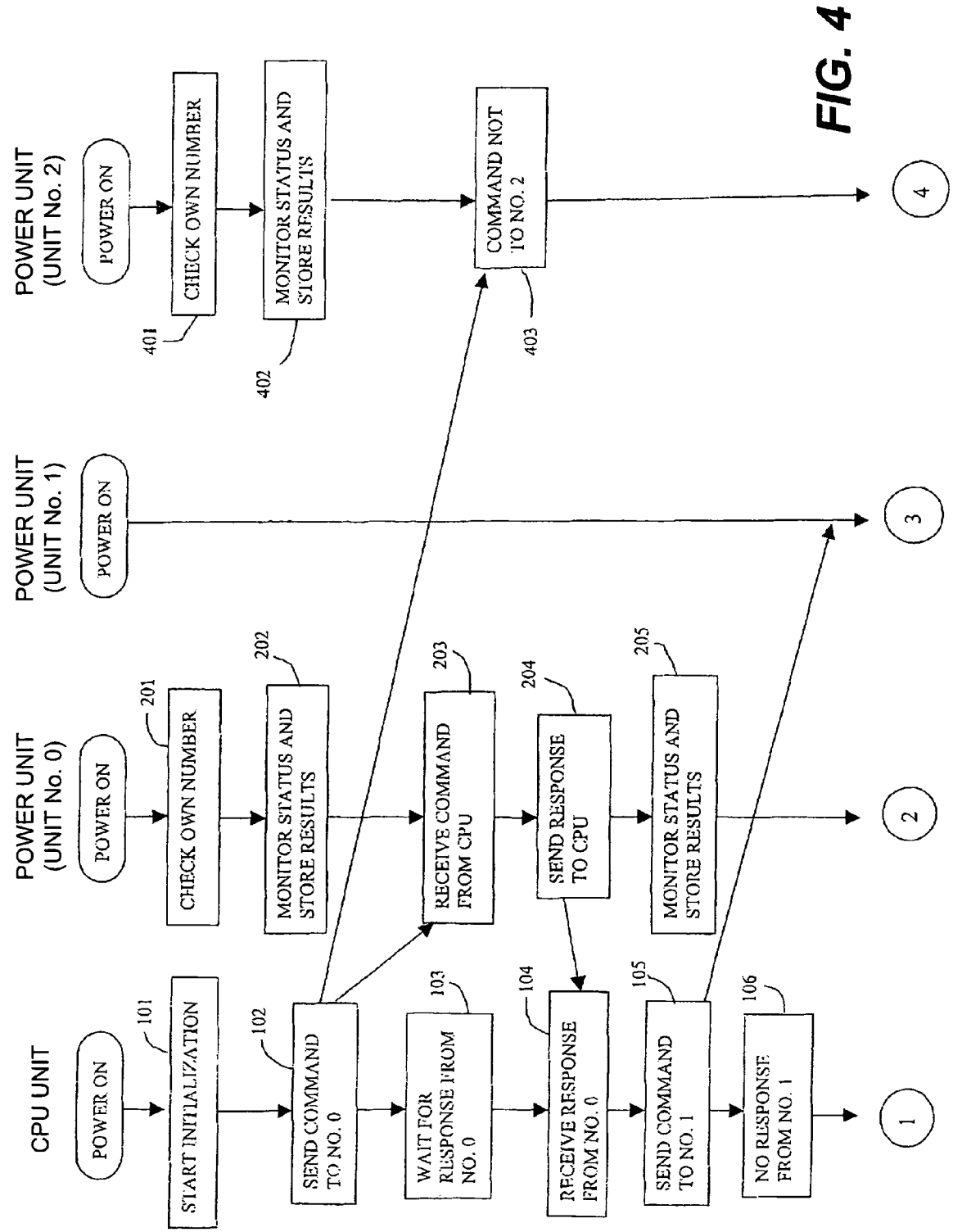
FIGS. 4, 5 and 6 are flowcharts of processes that are carried out between the CPU unit and each of the power units (device numbers 0-N) according to this invention.
Figure 5:
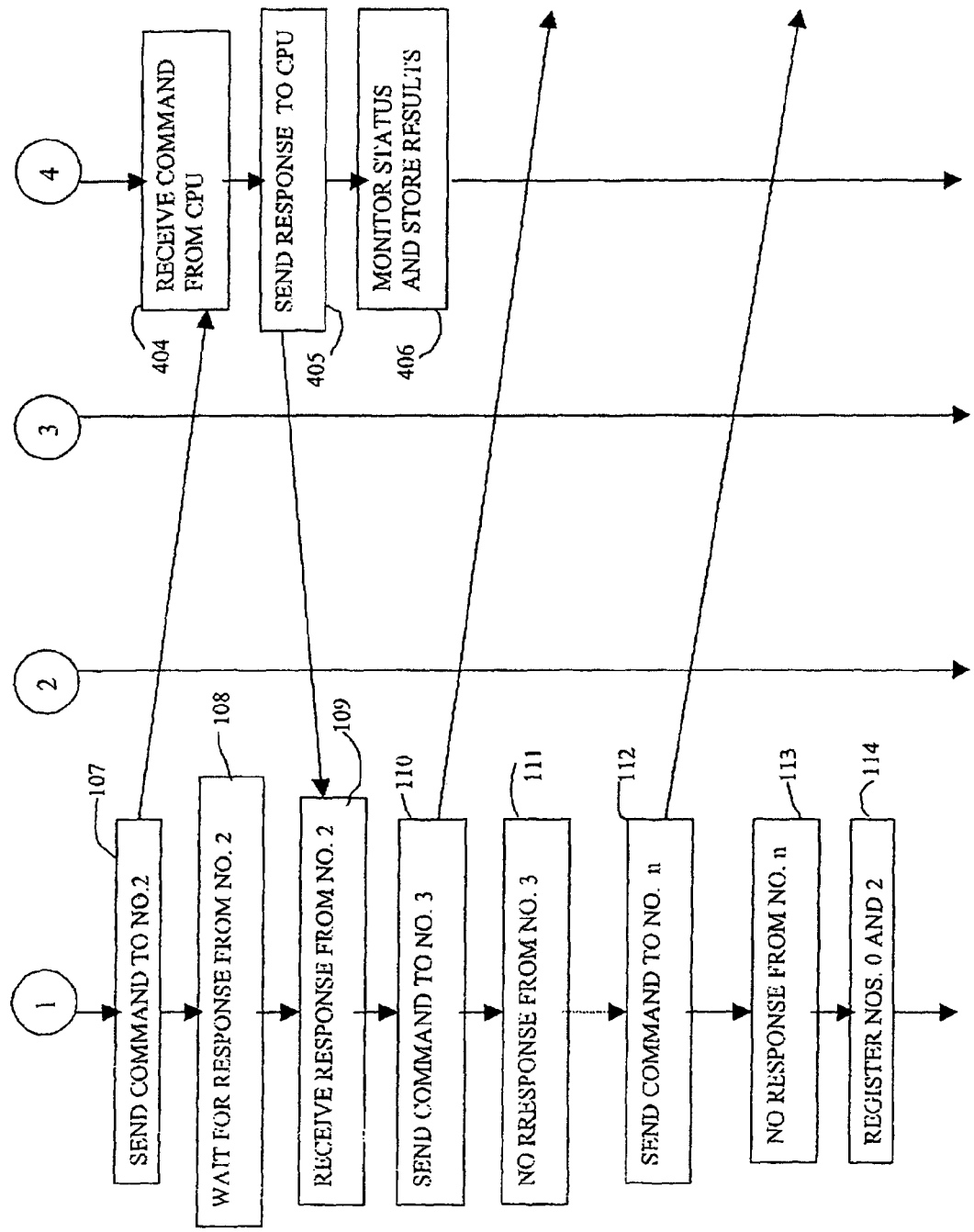

FIGS. 4 and 5 show a flowchart of the initialization process that is carried out between the CPU unit and each of the power units (device numbers 0-N) according to this invention. The initialization process is started as power is switched on in FIG. 4. In this illustrated example, the device number is "0" for the power unit of the main body device and is "1" and "2" respectively for the power unit of the first expansion unit and the power unit of the second expansion unit. It will be assumed that Devices "0" and "2" support the communication processes of this invention but that Device "1" is of a conventional type not supporting the communication processes.

As the CPU unit starts the initialization process (Step 101), each power unit except Device "1" checks its own device number, based on device number data obtained either from the device number setting switch 103 or the device number line NL (Steps 201 and 401). Thereafter, each power unit repeats the processes of monitoring the internal status (corresponding to the status data generation process) and storing the results of this monitoring process in the non-volatile inner memory 111 (Steps 202 and 402).

In the meantime, the CPU unit transmits a request command to Device "0" at an appropriate timing (Step 102) and enters a wait period thereafter for a response (Step 103). As this request command is received, Device "0" reads the command (Step 203), transmits a response back to the CPU unit (Step 204) and thereafter resumes the processes of monitoring the internal status and storing the status in the inner memory 111 (Step 205). The CPU unit checks the response from Device "0" and stores the received data in a corresponding area of the memory (Step 104).

Similar processes are repeated thereafter by the CPU unit sequentially by changing the address to Device "1", Device "2", Device "3", . . . , Device "N" (Steps 105, 113). Each power unit except Device "1" continuously repeats the processes of monitoring the internal status and storing status in the non-volatile inner memory (Step 402).

As the transmission of request commands to all device numbers is completed, the CPU unit recognizes that it was Devices "0" and "2" that are the power units it has communicated and this is registered in a specified area of the memory (Step 114). Thereafter, request commands will be transmitted only to these power units.

Figure 6:
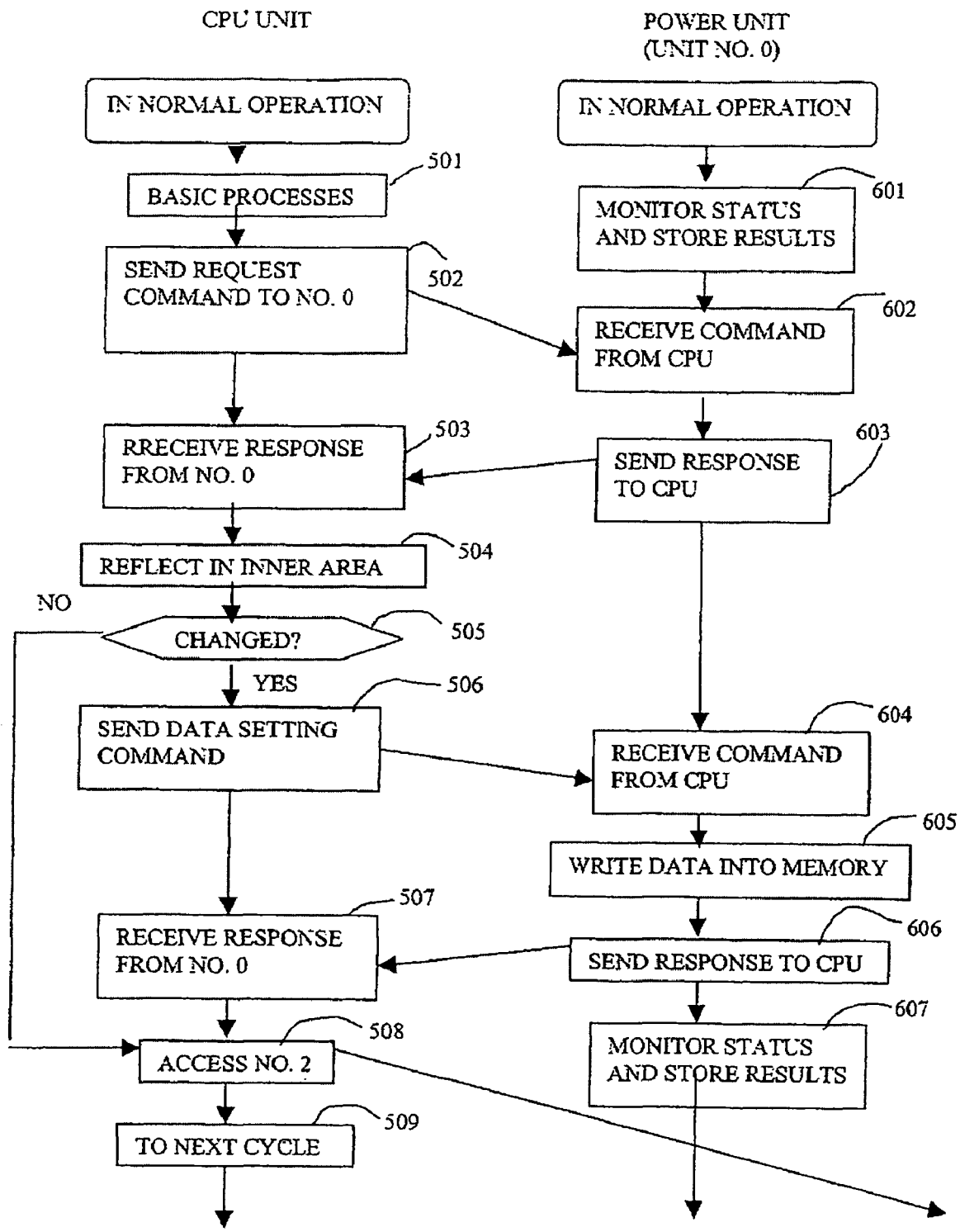

FIG. 6 shows a flowchart of the normal processes that are carried out between the CPU unit and each of the power units (device numbers 0-N) according to this invention.

As the normal processes are started, the CPU unit carries out the basic processes such as the common process, the input-output updating process, the command execution process and the system service process (Step 501) and transmits in the meantime a request command to Device "0" for status data (Step 502).

As for Device "0", it waits for the arrival of a command addressed to itself from the CPU unit while carrying out the processes of monitoring the internal status and storing status data in the non-volatile memory (Step 601). As a command addressed to itself is received from the CPU unit (Step 602), the data requested by the command are read out of the inner memory 111 and transmission data are prepared and transmitted to the CPU unit as response (Step 603).

As this response is received, the CPU unit recognizes it (Step 503) and causes it to be reflected in the CPU inner data areas which correspond to Areas A600-A604 of the memory map shown in FIG. 3 (Step 504).

Next, the CPU unit checks whether or not there has been a change in the CPU inner data setting areas which correspond to Areas A605-A609 of the memory map shown in FIG. 3 (Step 505). This means checking whether the user has changed any set values.

If it is ascertained that there is a change in the CPU inner data setting areas (YES in Step 505), a data setting command is transmitted to Device "0" (Step 506). As this command addressed to itself is received, (Step 604), the referenced data from the CPU are written into its own inner memory 111 (Step 605) and a response to this effect is transmitted to the CPU (Step 606).

As this response is received, the CPU units recognizes the response (Step 507) and thereafter repeats similar processes by accessing Device "2" (Step 508), proceeding to the next cycle of operations (Step 509).

The status data that are generated by Devices "0" and "2" by the initialization and normal processes shown in FIGS. 4, 5 and 6 (such as remaining time data, cumulative power-on time data, output current data, output voltage data and inner temperature data in this example) are transmitted to and stored in the power status area A6 of the memory in the CPU as shown in the memory map of FIG. 3. They are thereafter appropriately referenced through user commands such that various controls by the PLC main body become possible.

If set values are changed in areas A605-A609, newly set values are transmitted from the CPU unit to each power unit and similarly stored in the inner memory 111 of each power unit as shown in the memory map of FIG. 3. Each power unit may execute any (first, second or third) of the status data generating processes and the results of the measurement, status data generation and judgment processes are appropriately transmitted to the CPU unit, causing them to be stored in an appropriate portion of the I/O data area A5 of the power status area A6 for use in the user program or the system program.

In FIG. 2, the serial bus line SB and the device number line NL were shown as data transmission paths for transmitting status data generated by status data generating means provided to power units to the user access area of the memory of the CPU unit, it goes without saying that this is merely intended to be an example.

Figure 7:
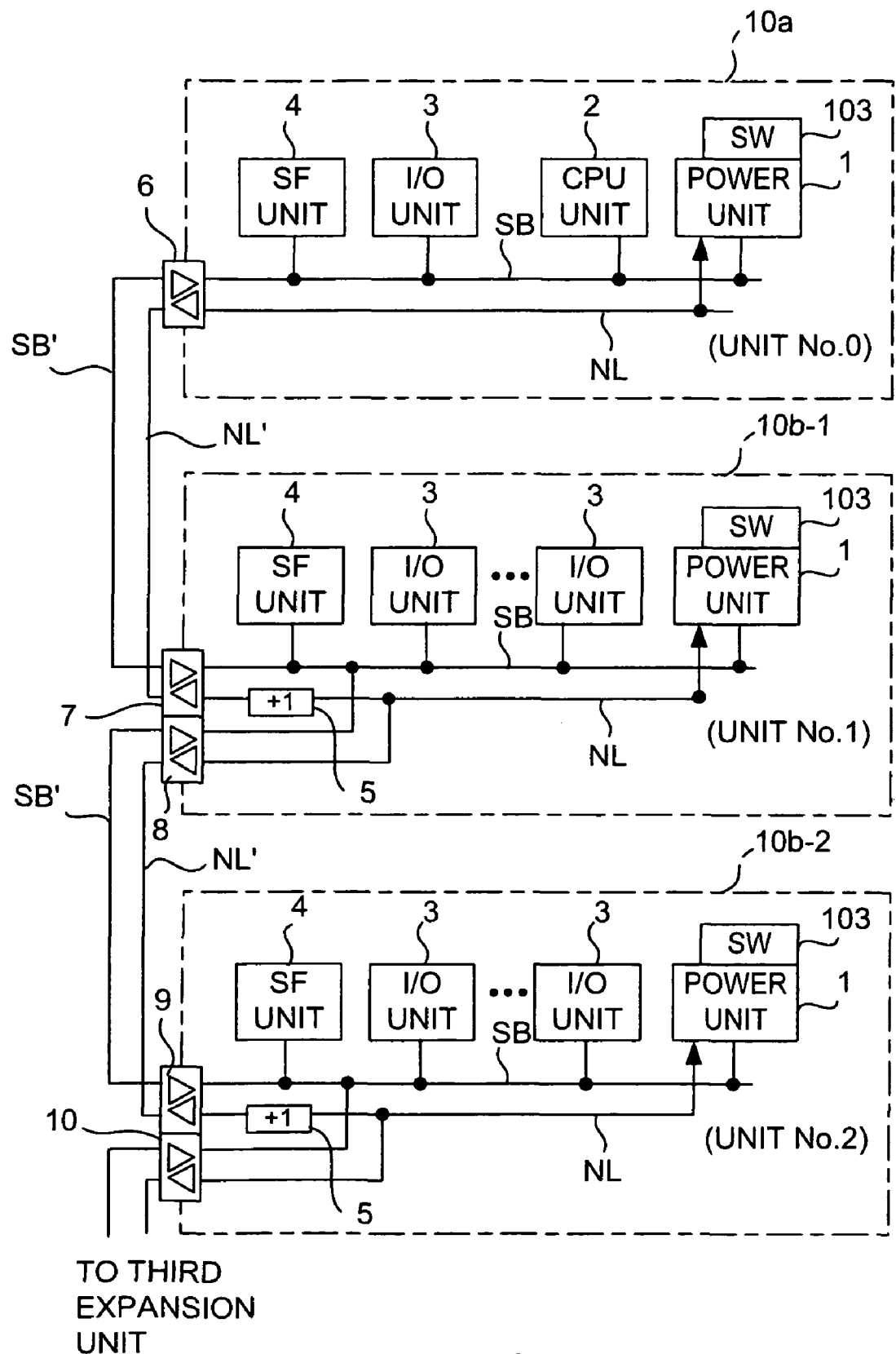
FIGS. 7, 8 and 9 are block diagrams showing the structures of other PLC systems.

FIG. 7 is a block diagram showing the structure of another PLC system. Like or equivalent components are indicated by the same numerals and will not be described repetitiously.

In this example, the CPU unit 2 and one or more I/O units 3 that form the PLC main body are connected by a serial bus line SB. In a situation like this example, the data transmission path between the power unit 1 and the CPU unit 2 can be formed by extending the serial bus SB.

Figure 8:
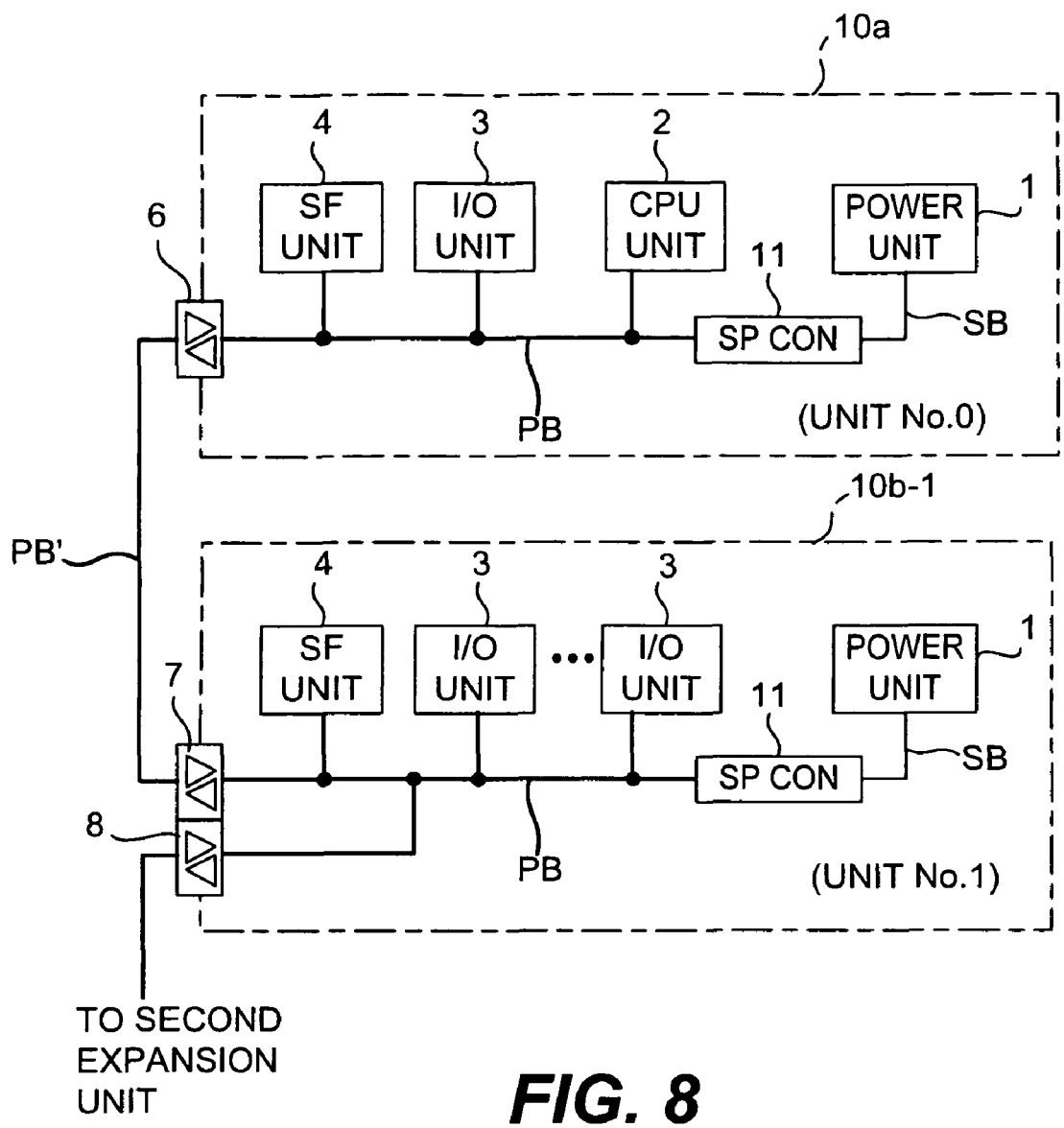

FIG. 8 is a block diagram showing the structure of still another PLC system. Like or equivalent components are indicated by the same numerals and will not be described repetitiously.

In this example, the CPU unit 2 and one or more I/O units 3 that form the PLC main body are connected by a parallel bus line PB. In a situation like this example, the data transmission path between the power unit 1 and the CPU unit 2 can be formed by connecting a dedicated serial bus line SB to the parallel bus line PB through a serial-parallel converter (SP CON) 11. If an enable register controllable by the control bus is mounted to this serial-parallel converter 11, it becomes possible to access only the power unit of the expansion unit which the CPU unit wishes to access. Thus, switches and control signals for setting device numbers become unnecessary. The bus exclusively for the power unit also becomes unnecessary.

Figure 9:
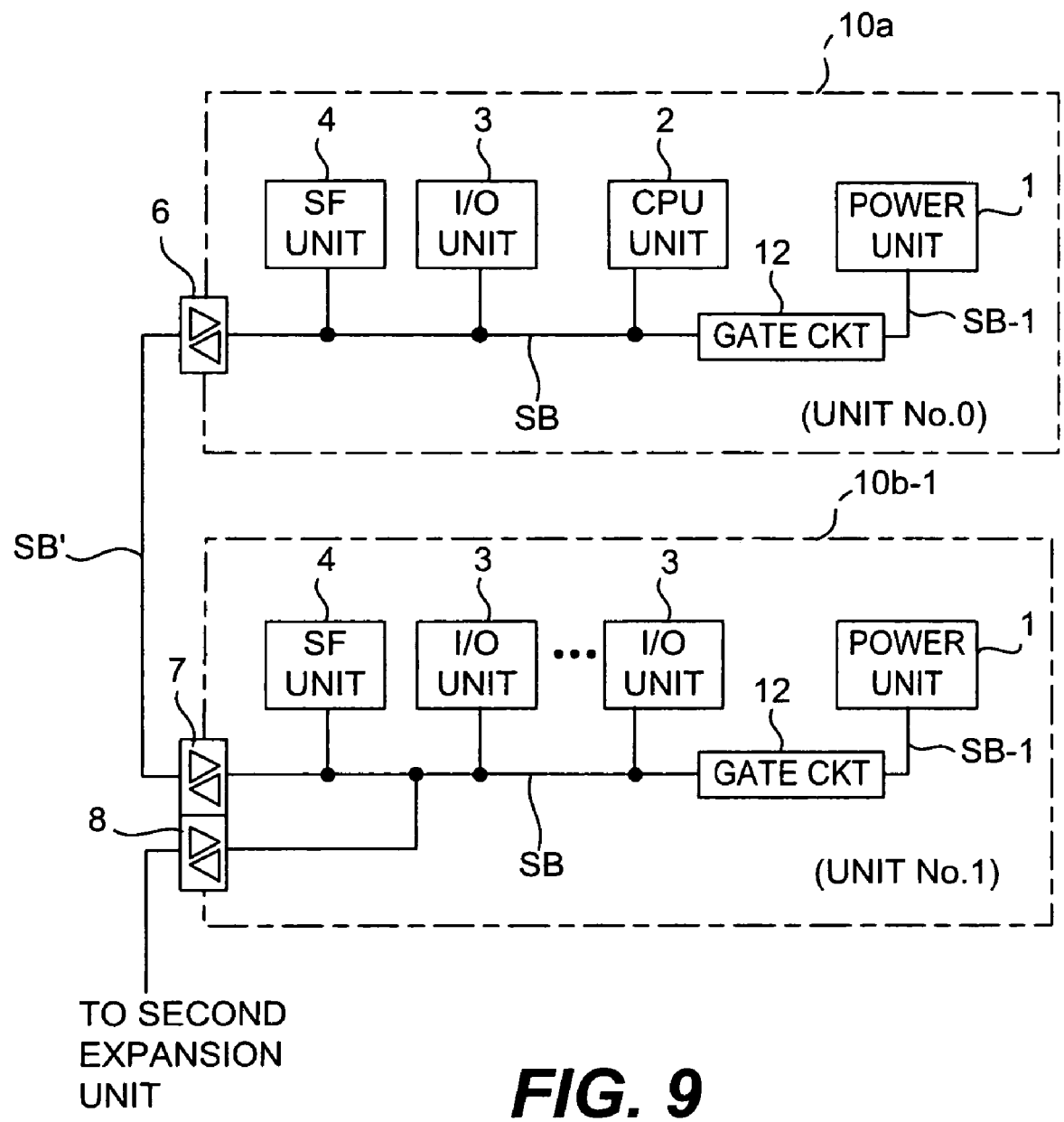

FIG. 9 is a block diagram showing the structure of still another PLC system. Like or equivalent components are indicated by the same numerals and will not be described repetitiously.

In this example, the CPU unit 2 and one or more I/O units 3 that form the PLC main body are connected by a serial bus line SB. In a situation like this example, the data transmission path between the power unit 1 and the CPU unit 2 can be formed by connecting a dedicated serial bus line SB-1 to this serial bus line SB through a gate circuit 12. The gate circuit 12 can be opened and closed by means of the dedicated bus. This example also has the merit that extra switches and buses can be dispensed with.

Figure 10:
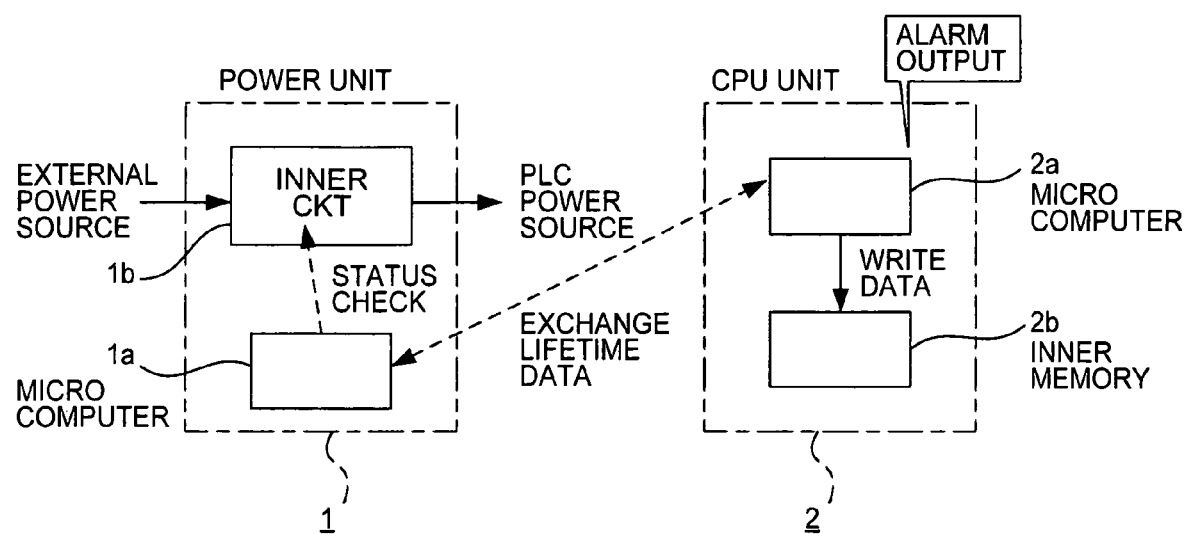
FIG. 10 is a conceptual diagram showing the basic operation of this invention.

FIG. 10 is referenced next to explain the concept of the operations of this invention. Like or equivalent components are indicated by the same numerals and will not be described repetitiously. In FIG. 10, symbol 1a indicates a microcomputer, symbol 1b indicates a power source inner circuit, symbol 2a indicates a microcomputer for the CPU unit and symbol 2b indicates an inner memory.

As schematically shown in FIG. 10, the internal status of the power source inner circuit 1b is constantly being monitored by the microcomputer 1a of the power unit 1. Lifetime data are exchanged between the power unit 1 and the CPU unit 2. As lifetime data are received by the CPU unit 2, they are stored in the inner memory 2b. In other words, the internal status of a power unit is always reflected to the inner memory 2b of the CPU unit 2. Thus, various controls become possible as this inner memory 2b is referenced by the user program or the system program.

Figure 11:
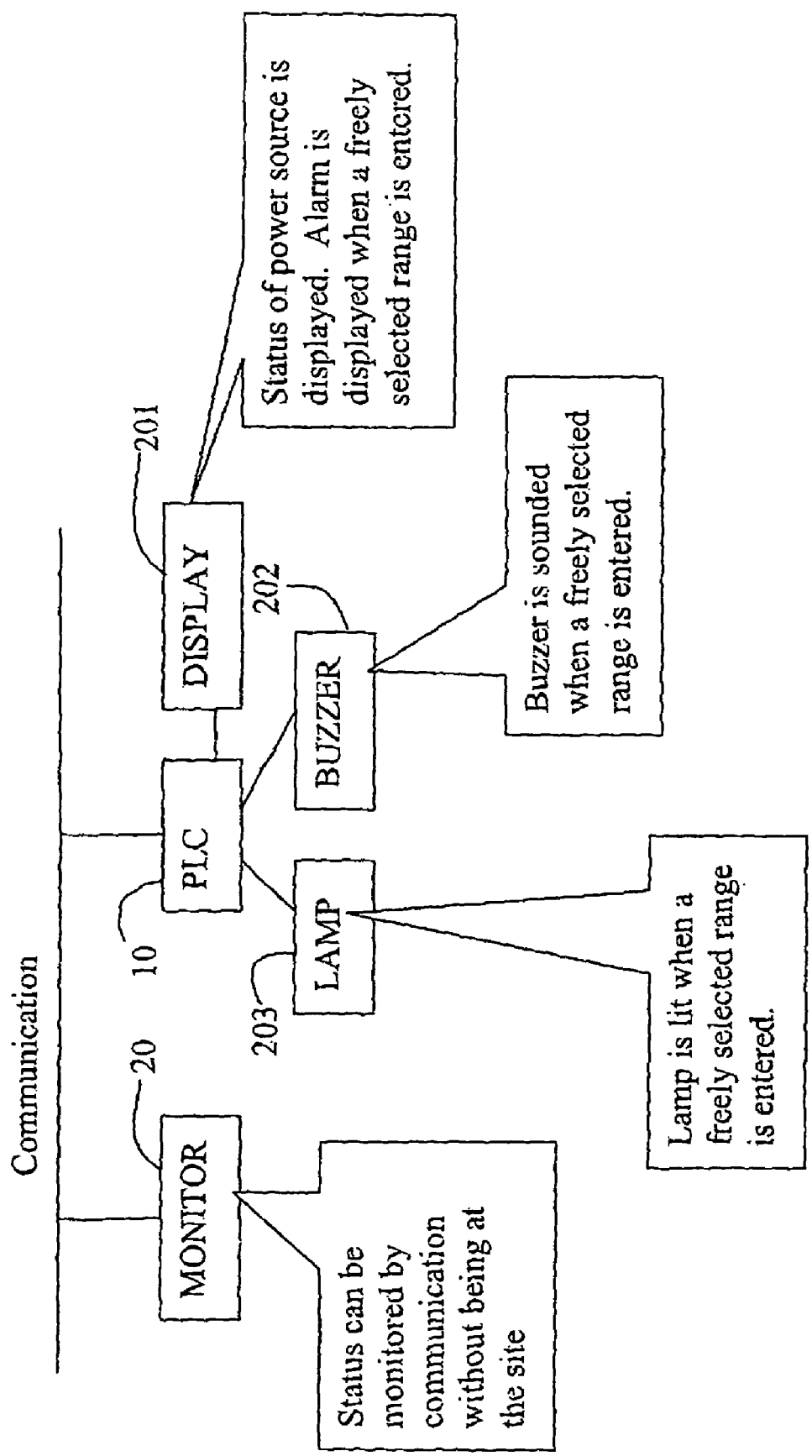
FIG. 11 is a diagram for showing an example of method for communicating the lifetime of power source.

FIG. 11 is a diagram for showing an example of method for reporting on the lifetime of power source. In FIG. 11, numeral 10 indicates a PLC, numeral 20 indicates a monitor, numeral 201 indicates a display, numeral 202 indicates a buzzer and numeral 203 indicates a lamp.

In this example, the status of the inner memory 2b of FIG. 10 is referenced by the user program or the system program to report on the lifetime of power source in various forms. The PLC 10 may be connected through an Ethernet line with the monitor 20 at a remote location. If it is judged on the basis of the condition of the inner memory 2b of the CPU unit that the power source lifetime is shorter than a specified reference value, and a report to this effect is made to the monitor 20, the user need not be at the location of the PLC 10 to make the report to the monitor 20 although it also goes without saying that an operator can be informed of the situation by displaying the report on the display 201, sounding the buzzer 202 and/or switching on the lamp 203.

Figure 12A:
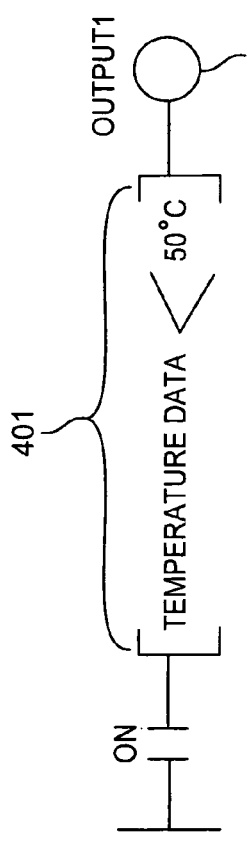
FIGS. 12A and 12B, together referred to as FIG. 12, show another example of method of reporting on the time for exchanging the power source.
Figure 12B:
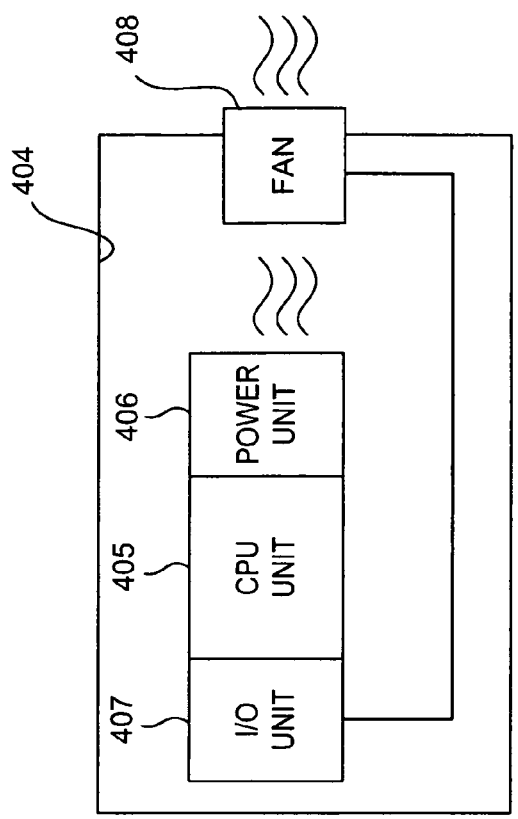

FIG. 12 shows another example of a method of reporting on the time to replace the power source. By this example, a dedicated command is defined as shown in FIG. 12A for switching on "OUTPUT 1" 303 if the remaining time data indicate that the time remaining until the power unit on the main body device is less than one year. If this dedicated command 301 is used, the function of reporting the time for exchanging can be realized by the instruction of the user program without using the MOV or COMP command. If the connection is as shown in FIG. 12B with a power unit 305, a CPU unit 304 and an I/O unit 306 and an alarm lamp 308 is connected to a signal output terminal of the I/O unit 306 corresponding to "OUTPUT 1" shown in FIG. 12A, the alarm lamp 308 can be switched on when the remaining time for the replacement becomes less than one year.

Figure 13A:
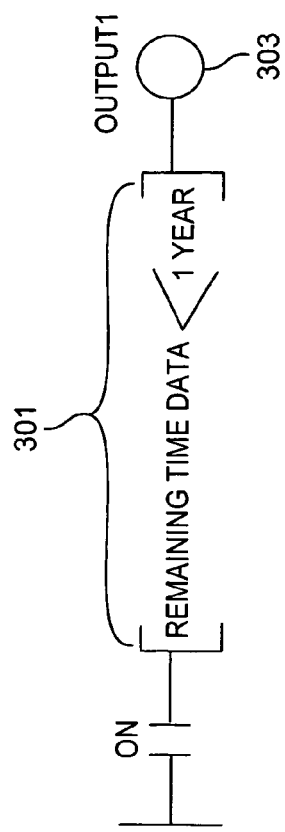
FIGS. 13A and 13B, together referred to as FIG. 13, show an example of method of controlling the temperature of a control board affected by the temperature of a power source.
Figure 13B:
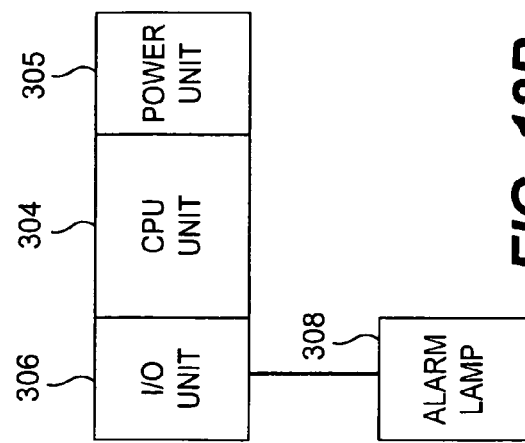
Figure 14:
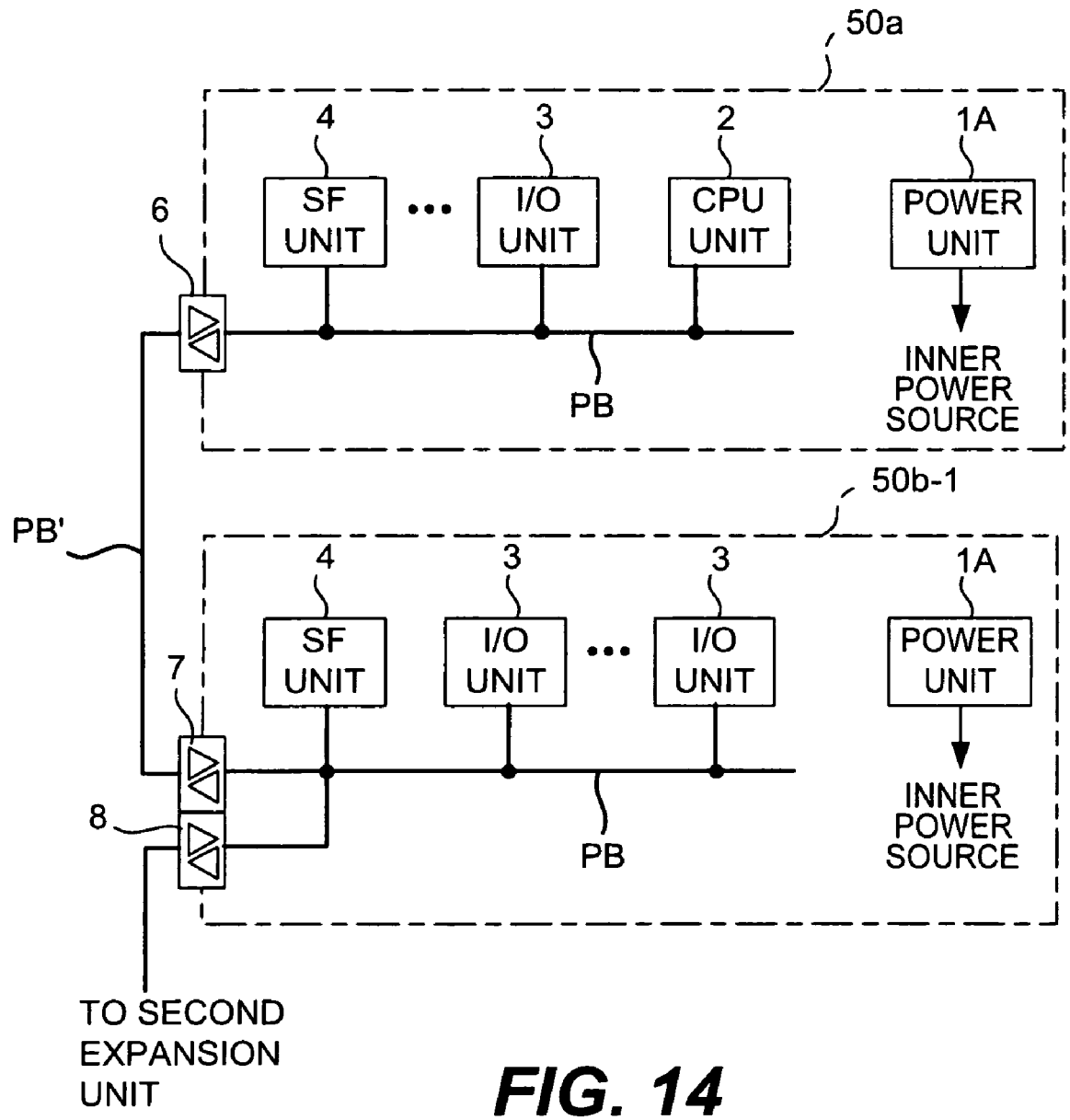
FIG. 14 is a block diagram showing the structure of a conventional PLC system as a whole.

FIG. 13 shows an example of controlling the temperature of a control board affected by the temperature of the power source. In this example, too, a dedicated command 401 is defined as shown in FIG. 13A. This dedicated command 401 is for switching on "OUTPUT 1" 403 such that the internal temperature of the power unit on the main body device will always be below 50° C. By using this dedicated command 401, the user can prevent the lifetime of the power unit from becoming shortened by overheating. Consider, for example, a situation where a power unit 406, a CPU unit 405 and an I/O unit 407 are contained inside a sealed control board 404. The control board 404 is provided with an external fan 408 for air discharge and its motor is arranged so as to be driven through a signal output terminal corresponding to "OUTPUT 1" 403 of the I/O unit.

With a structure as described above, the external fan 408 can be operated to forcibly cool the interior of the control board 404 only while the internal temperature data of the power unit exceed 50° C. without using the MOV or COMP command and the lifetime of the power unit 406 due to overheating can be prevented.

In summary, this invention is characterized as transmitting status data generated by status data generating means for a power unit to a user access area of a memory of the CPU unit such that the status data can be referenced by the user program or the system program. Thus, various useful functions can be realized based on the status data of the power unit without using external wiring to connect the CPU unit and the power unit.

What is claimed is:

1. A programmable controller device comprising:
   a programmable controller main body having a CPU unit and one or more I/O units connected by a bus line which connects to one or more expansion units through connecting bus lines;
   a power unit for supplying power to said programmable controller main body;
   each said one or more expansion units comprising a power unit for supplying power to a corresponding one of said one or more expansion units; and
   a data transmission path formed by a serial bus line and provided between said CPU unit and said power units;
   wherein said CPU unit has a memory with a user access area which is accessible by instruction of a user program and has dedicated areas assigned individually to said one or more expansion units and said programmable controller main body;
   wherein said power units have status data generating means for generating status data related to a said power units;
   wherein said status data generated by said status generating means are transmitted to said user access area;
   wherein a data transmission path formed by a serial bus line for transmitting status data generated by said status generating means to said user access area is provided between said CPU unit and said power units;
   wherein said user program is created and altered by the user of said programmable controller main body such that a control desired by the user can be carried out by executing said user program;
   wherein a user has only to insert dedicated commands corresponding to said user access area into said user program in order to access said status data.

2. The programmable controller device of claim 1 wherein said user program includes an instruction for execution of a specified calculation by using said status data transmitted to said user access area as calculation parameter.

3. The programmable controller device of claim 1 wherein said status data generating means includes detecting means for measuring specified physical quantity related to said power units and outputs the measured physical quantity as said status data.

4. The programmable controller device of claim 1 wherein said status data generating means includes detecting means for measuring specified physical quantity related to said power units, functioning to obtain a specified status quantity based on the measured physical quantity by said detecting means and a known correlation, to carry out status judgment by comparing the physical quantity measured by said detecting means or the obtained status quantity with a specified standard quantity and to output a result of said status judgment as said status data.

5. The programmable controller device of claim 1 wherein said status data generating means includes detecting means for measuring specified physical quantity related to said power units and functions to obtain a specified status quantity based on the measured physical quantity by said detecting means and a known correlation and to output the status quantity obtained thereby as said status data.

6. The programmable controller device of claim 5 wherein said specified physical quantity includes the temperature of an electrolytic capacitor in said power units and said status quantity includes the remaining time for the replacement of said power units.

7. The programmable controller device of claim 6 wherein said status quantity includes the remaining time for the replacement of said power units and said user program includes a dedicated instruction for switching on a specified output when the remaining time for the replacement of said power unit serving as said specified physical quantity transmitted to said user access area becomes less than a specified reference value.

8. The programmable controller device of claim 1, wherein said status data generating means includes:
   detecting means for measuring specified physical quantity related to said power unit, said detecting means functioning:
      to obtain a specified status quantity based on the measured physical quantity by said detecting means and a known correlation,
      to carry out status judgment by comparing the physical quantity measured by said detecting means or the obtained status quantity with a specified standard quantity, and
      to output at least one of the measured physical quantity, the specified status quantity and a result of said status judgment as said status data.

9. A programmable controller system comprising:
   a main body;
   one or more expansion units; and
   a bus line that connects said main body with said one or more expansion units;
   wherein said main body comprises:
   a programmable controller main body having a CPU unit and one or more I/O units connected by a bus line; and
   a power unit for supplying power to said programmable controller main body;
   wherein said CPU unit has a memory with a user access area for individual units which is accessible by instruction of a user program and has dedicated areas assigned individually to said one or more expansion units and said programmable controller main body;
   wherein said power unit has status data generating means for generating status data related to said power unit;
   wherein each of said expansion units comprises:
   one or more expansion I/O units connected through a bus line;
   an expansion power unit for supplying power to said one or more expansion I/O units, said expansion power unit including additional status data generating means for generating status data related to said expansion power unit;

wherein said programmable controller system further comprises a data transmission path
between said CPU unit and said power unit and between said CPU unit and the expansion power units for transmitting said status data generated by said status generating means and the additional status generating means to said user access area is provided between said CPU unit and said power unit;
   wherein said user program is created and altered by a user of said programmable controller main body such that a control desired by the user can be carried out by executing said user program;
   wherein the user has only to insert dedicated commands corresponding to said user access area into said user program in order to access said status data.

10. The programmable controller system of claim 9, wherein said status data generating means and said additional status data generating means include:
   detecting means for measuring specified physical quantity related to said power unit, said detecting means functioning:
      to obtain a specified status quantity based on the measured physical quantity by said detecting means and a known correlation,
      to carry out status judgment by comparing the physical quantity measured by said detecting means or the obtained status quantity with a specified standard quantity, and
      to output at least one of the measured physical quantity, the specified status quantity and a result of said status judgment as said status data.

11. The programmable controller system of claim 9, wherein said status data generating means includes:
   detecting means for measuring specified physical quantity related to said power unit, said detecting means functioning:
      to obtain a specified status quantity based on the measured physical quantity by said detecting means and a known correlation,
      to carry out status judgment by comparing the physical quantity measured by said detecting means or the obtained status quantity with a specified standard quantity, and
      to output at least one of the measured physical quantity, the specified status quantity and the result of said status judgment as said status data.

* * * * *